March 22, 1966 — H. W. SIMPSON ETAL — 3,241,398
FLUID COUPLING PLANETARY GEAR TRANSMISSION
Filed April 6, 1959 — 4 Sheets-Sheet 1

INVENTORS
HOWARD W. SIMPSON
LLOYD M. FORSTER
ATTORNEYS

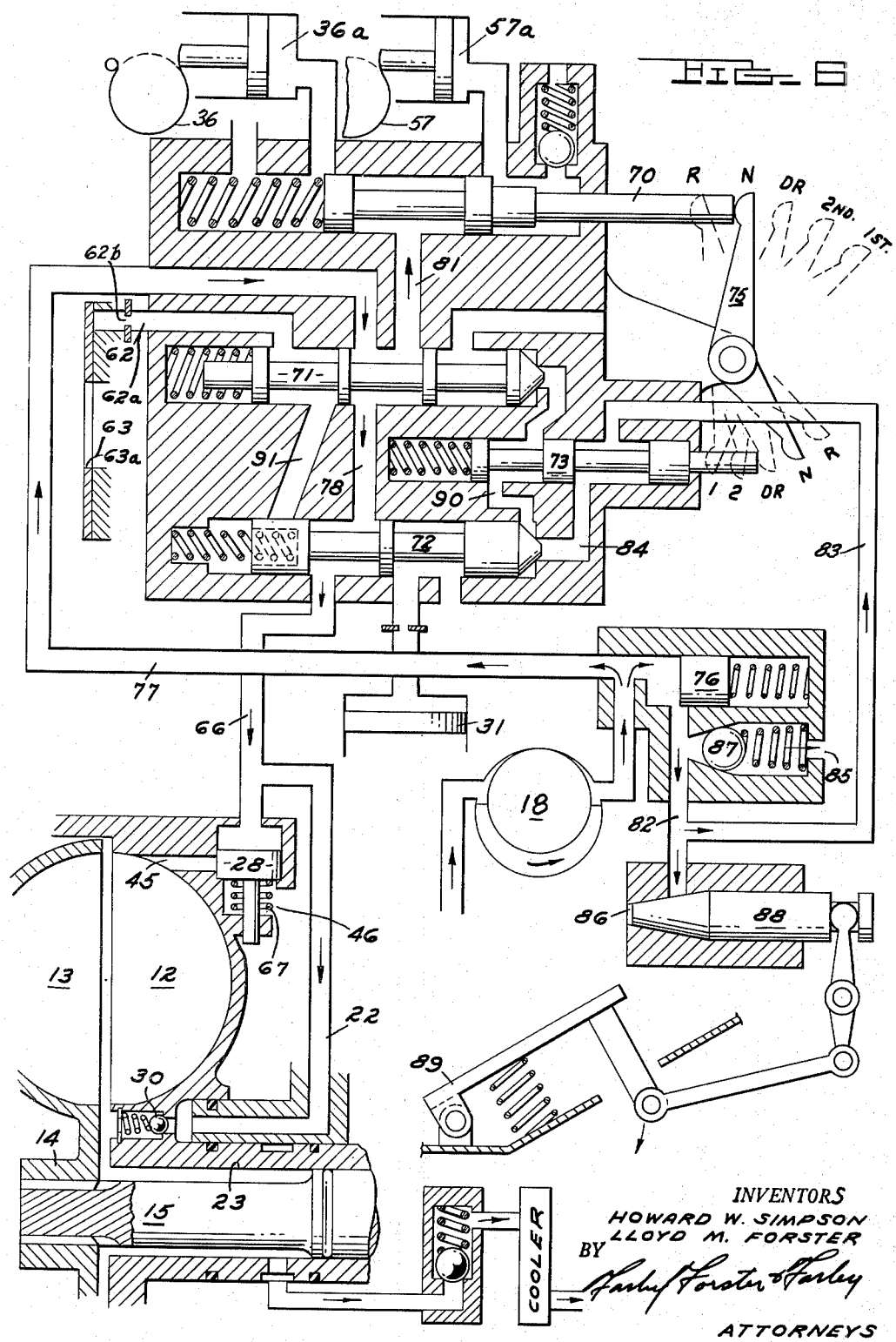

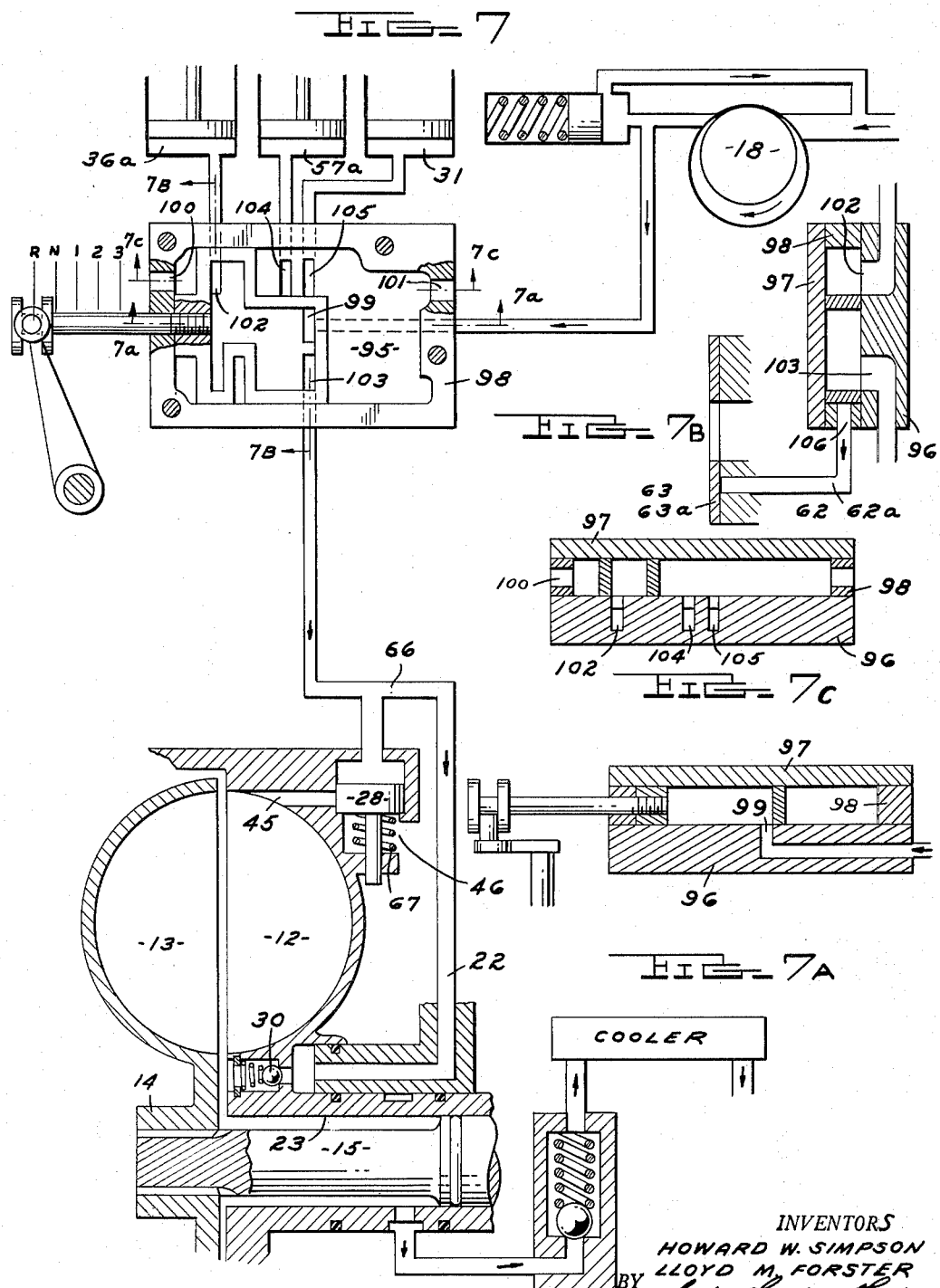

United States Patent Office 3,241,398
Patented Mar. 22, 1966

3,241,398
FLUID COUPLING PLANETARY GEAR
TRANSMISSION
Howard W. Simpson, 730 Crescent Drive, Dearborn,
Mich., and Lloyd M. Forster, 1624 Lochridge Road,
Bloomfield Hills, Mich.
Filed Apr. 6, 1959, Ser. No. 804,191
8 Claims. (Cl. 74—645)

This invention relates to an automatic transmission for self-propelled vehicles of the fluid coupling-planetary gear type having three forward and one reverse speed ratios. Two simple planetary gear sets are adapted to provide the respective speed ratios by selective engagement of the fluid coupling, two friction brakes, and one friction clutch.

The carriers of the two planetary sets are integral with each other and the output shaft. The sun gear of one set is integral with the ring gear of the other set and such gears are selectively held by one of the friction brake elements. The ring gear of the one set is selectively held by the other friction brake or driven by the friction clutch by a drive connection direct from the input shaft bypassing the fluid coupling. The sun gear of the other set is driven by the output element of the fluid coupling which is filled in low, high, reverse and neutral and emptied for second speed only. The friction clutch is engaged for second and high speed drive while one of the brakes is engaged for low and second and the other for reverse.

Alternative control systems are disclosed, one of which is fully automatic in shifting through first, second and high, while the other is semi-automatic employing a manual valve for controlling the speed ratios effected by hydraulic shifts under power.

The objects of the invention will be readily understood from the following detailed description of a preferred embodiment of the transmission and the alternative control systems shown in the drawings wherein:

FIGURE 6 is a schematic diagram of the fully automatic control system;

FIGURE 7 is a schematic diagram of the semi-automatic control system;

FIGURE 7A is a sectional view taken along the lines a—a of FIGURE 7;

FIGURE 7B is a sectional view taken along the lines b—b of FIGURE 7; and

FIGURE 7C is a sectional view taken along the lines c—c of FIGURE 7.

Figures 1, 1A:
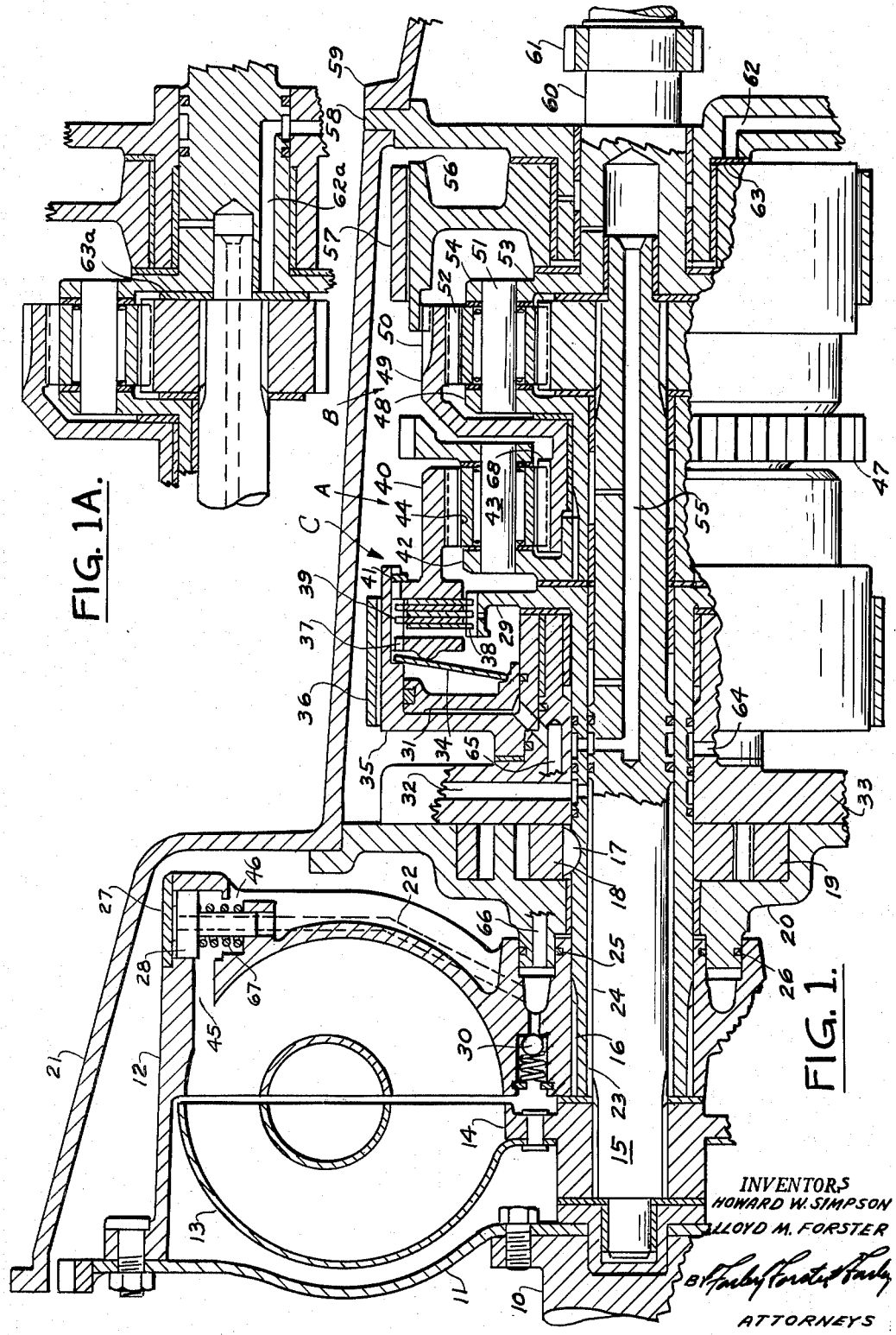
FIGURE 1 is a sectional side elevational layout view of the transmission.
FIGURE 1A is a fragmentary view showing a modification of a portion of the transmission shown in FIGURE 1.
Figure 2:
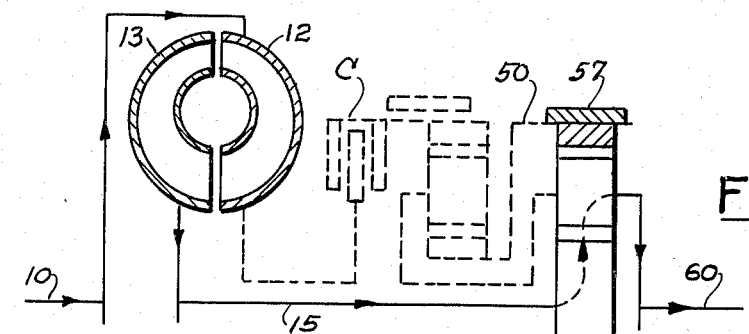
FIGURES 2–5 are schematic views of the transmission showing the active elements and torque paths for low, second, high and reverse speed drives respectively.
Figure 3:
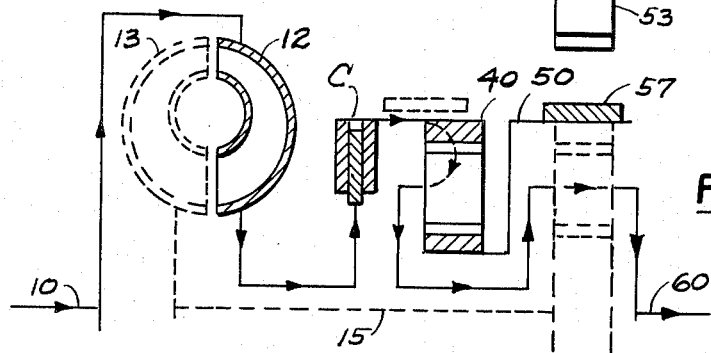
Figure 4:
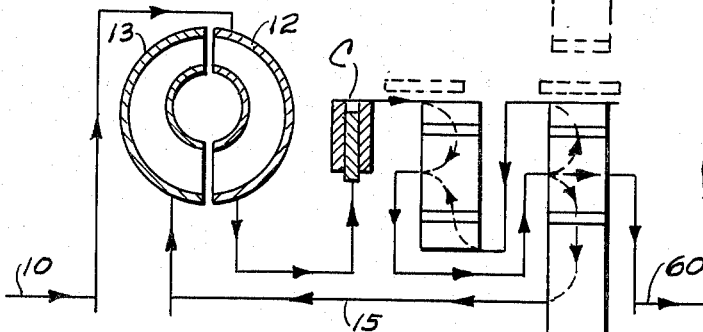
Figure 5:
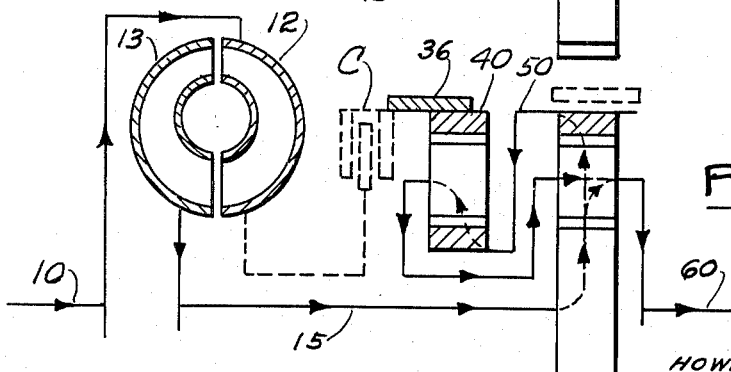

Referring to FIGURE 1, input engine power is delivered from shaft 10 and flange 11 to the fluid coupling impeller 12 which is rotatable relative to the stationary hub sealed by rings 25 and 26 and is splined at 16 to sleeve 23 piloted in stationary wall 20 bolted to the bell housing 21. Sleeve 23 is directly connected by flange 29 to input plates 38 of clutch C which when engaged by fluid pressure acting on piston 31 operating levers 34 and pressure plate 37 against reaction ring 41 directly couples the engine to the ring gear 40 of planetary gear set A. This driven turbine 13 of the fluid coupling is mounted on flange 14 which is splined to shaft 15 which in turn is splined to sun gear 53 of planetary gear set B. The sun gear 68 of planetary gear set A is integrally connected to the ring gear 49 of planetary gear set B. The planet gear carrier 42 of gear set A, supporting pins 43, planet gears 44 and parking lock gear 47, is splined to the planet gear carrier 48 of gear set B, supporting pins 51 and planet gears 52, which in turn is integrally connected to the flange 54 and output shaft 60. Brake drum 56 journalled on the hub of wall 58 bolted to the housing 21 and extension housing 59 is splined at 50 to ring gear 49 and is adapted to be held by friction brake band 57.

Another drum 35 splined to ring gear 40 of gear set A carries the driven clutch plates 39 of clutch C as well as the clutch actuating piston 31. Such drum is piloted on a stationary hub of plate 33 bolted to wall 20 and is adapted to be held stationary by friction brake band 36. An engine driven pump driven by sleeve 23 through key 17 has an inner element 18 and outer element 19 mounted in the wall 20. The pump is fed by passages 32, 24 and supplies fluid pressure through passages not shown for operating the brakes, through passage 65 for operating the clutch and through passage 66 and pressure reducing ball check valve 30 for filling the fluid coupling as well as for lubrication as through passages 64, 55. A plurality of fluid coupling exhaust valves 28 located within seal ring 27 in the impeller, when opened as shown, permit coupling fluid to empty through passages 45 and ports 46. The valves 28 are held closed by oil pressure in lines 22 communicating with the top of the valves overcoming centrifugal pressure and springs 67.

Operation

In neutral, the coupling is filled while brake bands 36 and 57 and clutch C are released.

When the transmission is shifted to low speed drive brake band 57 is applied holding the ring gear 49 stationary. Coupling slippage at idling speed now permits the carriers and output shaft to remain stationary and, upon throttle opening, low speed drive is established through the coupling and sun gear 53 with torque reaction against stationary ring gear 49.

Second speed drive is established by the application of clutch C and release of coupling fluid whereupon ring gear 40 is directly driven, sun gear 68 providing reaction. The sun gear 53 and turbine 13 of the coupling are now overdriven by the planet gear carrier 48 as permitted by the empty coupling.

Direct drive is established by refilling the coupling and releasing brake band 57, whereupon a regenerative drive is established through the coupling with the turbine 13 driving the impeller 12. It should be noted that in low speed drive full torque passes through the coupling in the conventional direction to drive sun gear 53, while in direct drive only a minor fractional torque is transmitted in the regenerative drive through the coupling. Thus while a fluid cushion is provided in direct drive permitting somewhat higher engine speeds for acceleration at lower vehicle speeds, the fractional torque minimizes coupling loss in normal direct drive operation.

Reverse drive is established with the coupling filled, brake band 36 applied and clutch C and brake band 57 released. Here, as in low, all engine torque passes through the coupling to sun gear 53 which drives ring gear 49 and sun gear 68 backwards at a speed established by the stationary ring gear 40.

Where identical planetary gear sets are employed, for example, with sixty teeth in the ring gears and thirty teeth in the sun gears, low and reverse speed ratios of 3 to 1 and a second speed ratio of 1½ to 1 may be obtained. Alternative gear ratios, for example, such as 3.40 in low, 1.583 in second and 3.12 in reverse may be obtained by modifying the gear sizes to seventy-two teeth in each of the ring gears, forty-two teeth in the sun gear 68 and thirty teeth in the sun gear 53.

The transmission lends itself to smooth shifting through use of the fluid coupling cushion in both upshifts. The transition involved in making a one-two upshift may be understood by considering successive stages in the application of clutch C. In low all forward torque is transmitted through the coupling to the sun gear 53, while in second, the sun gear 53 is overdriven by the carrier 48. Thus initial application of the clutch C will have the effect of progressively reducing the forward torque delivered through sun gear 53 to zero. At this moment, the fluid is rapidly emptied from the coupling and the clutch C engagement is completed reducing the engine speed to second speed while full torque is passing through the clutch C.

In second speed, the full backward reaction torque on sun gear 68 is held by brake band 57. In shifting from second to third as fluid is introduced into the coupling, the drive absorbed by sun gear 53 reduces the backward torque on brake band 57 until it reaches zero whereupon it may be released. As the coupling continues to be filled and the turbine 13 slows down the sun gear 53, ring gear 49 picks up forward speed until, when the turbine approaches synchronous speed with the impeller 12, the two planetary sets will be substantially locked up in direct drive.

From a timing standpoint, it is desirable in making the one-two shift that the fluid be emptied rapidly at the moment that clutch C has absorbed substantially the full torque in order that the coupling turbine 13 may not offer a resistance drag as it is accelerated to an overdriven condition. In order to time the opening of the valves 28 in relation to the absorption of torque by clutch C, the reduction of torque on helical sun gear 53 is employed to permit the opening of an exhaust port 62 held closed by thrust washer 63. Thus as long as low speed torque is transmitted through the fluid coupling to sun gear 53, the thrust from the helical angle will be transmitted through the flange 54 and brake drum 56 to the thrust washer 63 holding the exhaust port 62 closed, such port being permitted to open when the torque absorbed by the application of second speed clutch C substantially relieves the sun gear 53 of driving torque. In FIGURE 1A, an alternative exhaust port 62a is held closed during sun gear torque transmission by an alternative thrust washer 63a more directly responsive to diminution of sun gear torque. The manner in which the exhausting of pressure from port 62 or 62a is employed in the opening of the valves 28 is subsequently explained in connection with the hydraulic control circuit.

While it is desirable that fluid be emptied rapidly from the coupling in completing the one-two upshift, as permitted by several wide open passages 46 when the valves 28 open, there is no comparable requirement for rapid filling of the coupling in effecting a two-three upshift. Thus the filling may take place gradually until the backward reaction torque on brake band 57 has been picked up by the coupling and may continue gradually thereafter in bringing the coupling elements to synchronous speed, the only timing requirement being that of a prompt release of brake band 57 when the backward torque reaction thereon has substantially disappeared so as not to interfere with the subsequent forward rotation of the ring gear 49. By employing a double wrap brake band self-energizing in the direction of backward reaction torque, a relatively light actuating pressure on the band during the shift transition will permit the brake to operate substantially as a one-way brake with a self-timing release feature in permitting the ring 49 to move forwardly and a gradual release of such brake actuating pressure free of critical timing requirements will be adequate to assure a smooth shift without undue brake drag.

Referring to the schematic control diagram shown in FIGURE 6, the valve elements include a manual valve 70, a two-three shift valve 71, a one-two shift valve 72 and a shift limiting valve 73. Such valves ultimately control the application of pressure from the engine driven pump 18 to the second and high speed clutch piston 31, the low and second speed brake actuating cylinder 57a, the reverse brake actuating cylinder 36a, the fluid coupling 12, 13 and fluid coupling exhaust valves 28.

With the manual control lever 75 in the neutral position as shown, both brake cylinders 57a and 36a are open to exhaust as well as the clutch piston 31 while pump pressure controlled by pressure regulator valve 76 communicates through passage 77, valve 71, passage 78, valve 72 and passage 66 with the exhaust valves 28 holding them closed as well as through pressure reducing check valve 30 into the fluid coupling 12, 13. When the manual lever 75 is moved to the "DR" position, fluid pressure from passage 77 is admitted through valve 71, passage 81 and valve 70 to the first and second brake actuating cylinder 57a thereby engaging low speed drive. Slip in the coupling will now permit the vehicle to remain stationary with the accelerator released. Discharge from pump 18 after meeting other requirements and opening valve 76 will fill passages 82, 83 and 84 and exhaust through ports 85 and 86 respectively under control of a spring loaded ball 87 and a tapered valve 88 operating in tapered valve seat responsive to the position of accelerator pedal 89. As engine speed increases, the ball 87 will open a progressively increasing orifice around the ball to the exhaust port 85 thereby providing a pressure in passage 82 increasing with engine speed while the tapered valve 88 will open progressively an orifice passage communicating with exhaust port 86 providing a pressure in passage 82 decreasing with throttle opening. Thus a differential pressure increasing with engine speed and decreasing with throttle opening will be applied to a portion of the tapered end of valve 72. When such pressure operating on the fractional end area of valve 72 becomes sufficient to overcome the bias of the spring at the other end, the valve will move off of its seat whereupon pressure operating on the full end area of the valve will move it through its full travel to a position for effecting a one-two shift. This is accomplished by the application of pressure on the clutch piston 31 and the connecting of passage 66 with exhaust port 62, 62a controlled by thrust washer 63, 63a. As the torque diminishes on sun gear 53 from the absorption of torque by clutch C, the thrust washer opens the exhaust port 62, 62a exhausting pressure from passage 66 permitting valves 28 to open under centrifugal pressure assisted by springs 67. An orifice 62b limits the discharge through exhaust port 62 when torque is released in first or third speed ratios as in the case of closed throttle engine braking so that the exhaust flow will be insufficient to release valves 28 or materially deplete the pressure supply. Since the total displacement of valves 28 is relatively small, such orifice permits a prompt movement of the valves to exhaust position when the supply pressure is blocked.

Shift control pressure in passage 84 upon the shifting of valve 72 also communicates through passage 90 and valve 73 with a fractional end area of valve 71. A slightly higher effective spring preload pressure at the other end of valve 71 from that operating on valve 72 prevents valve 71 from opening during initial movement of valve 72 to its shift position and the reduction in engine speed from the one-two shift, while insufficient to permit the return of valve 72 due to the increased area subjected to such pressure, prevents valve 71 from opening until engine speed plus throttle opening establish a pressure sufficient to initially displace valve 71 whereupon valve 71 moves to a two-three shift position exhausting pressure from cylinder 57a and reapplying pressure from passage 77 through valve 71, passage 91, valve 72 and passage 66 to close valves 28 and refill the coupling thereby establishing direct drive.

When the manual lever 75 is moved from neutral to "2" position, the one-two upshift sequence previously described will likewise take place; however, the two-three upshift will be prevented by the movement of valve 73 to a position blocking communication between passage 90 and valve 71. If the manual valve is moved from neutral to "1" position, valve 73 will be displaced to a position blocking passage 83 from 84 thereby holding the transmission in low speed.

Referring to FIGURE 7 showing an alternative simplified semi-automatic control, a single manual valve 95 is adapted to control the application and release of the brake, clutch and fluid coupling elements. Such manual valve operates between two flat surfaces provided by a manifold plate 96 and a cover plate 97 separated by a spacer plate 98. The valve 95 has a through center opening extending from face to face of the respective manifold and cover plates which is always in communication with pressure port 99 supplied by pump 18. Accordingly, the interior of the valve is always pressurized while the exterior ends of the valve communicate at all times with exhaust ports 100 and 101. In the "R" position of the valve shown, pressure communicates with port 102 leading to brake cylinder 36a for actuating reverse brake band 36 as well as with port 103 leading to fluid coupling exhaust valves 28 thereby holding such valves closed, filling the coupling and actuating the reverse brake band. In the "N" position of the manual valve, port 102 is opened to exhaust releasing the reverse brake band while port 103 remains pressurized. When the valve is moved to position "1" port 104 leading to cylinder 57a for actuating brake band 57 becomes pressurized thereby establishing low speed drive. When the valve is moved to position "2," port 104 remains pressurized, port 105 leading to clutch actuating piston 31 becomes pressurized and port 103 exhausts through port 106 leading to port 62, 62a and thrust washer valve 63, 63a thereby establishing second speed drive. When the valve is moved to position "3," port 104 is opened to exhaust releasing brake band 57, port 105 remains pressurized while port 103 is repressurized thereby establishing direct drive.

While a preferred embodiment together with alternative fully automatic and semi-automatic control systems have been described above in detail, it will be understood that numerous modifications may be resorted to without departing from the scope of the invention as defined in the following claims.

We claim:
1. A planetary gear transmission comprising an input shaft, an output shaft, two axially aligned planetary gear sets interposed therebetween each having a ring gear, a sun gear and a planet gear carrier with a plurality of planet gears each meshing with said ring and sun gears, means connecting both carriers with said output shaft, means connecting the sun gear of one set with the ring gear of the other set, selectively engageable brake means for each of the ring gears, a fluid coupling having an input impeller element driven by said input shaft and an output turbine element drivingly connected to the sun gear of said other set, means for inactivating said fluid coupling, selectively operable clutch means for connecting said input shaft with the ring gear of said one set thereby eliminating driving torque on the sun gear of said other set, and means responsive to engagement of driving torque by said clutch means adapted to activate said means for inactivating said fluid coupling.

2. A planetary gear transmission comprising an input shaft, an output shaft, two axially aligned planetary gear sets interposed therebetween each having a ring gear, a sun gear and a planet gear carrier with a plurality of planet gears each meshing with said ring and sun gears, means connecting both carriers with said output shaft, means connecting the sun gear of one set with the ring gear of the other set, a fluid coupling having an input impeller element driven by said input shaft and an output turbine element drivingly connected to the sun gear of said other set, means for inactivating said fluid coupling, releasable means for holding the ring gear of said other set against backward rotation, releasable means for connecting the input shaft with the ring gear of said one set thereby eliminating driving torque on the sun gear of said other set, and means responsive to engagement of driving torque by said last releasable means adapted to activate said means for inactivating said fluid coupling.

3. A planetary gear transmission comprising an input shaft, an output shaft, two axially aligned planetary gear sets interposed therebetween each having a ring gear, a sun gear and a planet gear carrier with a plurality of planet gears each meshing with said ring and sun gears, means connecting both carriers with said output shaft, means connecting the sun gear of one set with the ring gear of the other set, a fluid coupling having an input impeller element driven by said input shaft and an output turbine element drivingly connected to the sun gear of said other set, means for activating said fluid coupling, means for holding the ring gear of said other set against backward rotation providing a low speed drive with full torque passing through the fluid coupling to the sun gear of said other set, engageable means for connecting the input shaft with the ring gear of said one set providing a second speed drive with full torque passing through said engageable means and with the sun gear of said other set over-driven at more than input shaft speed, and means responsive to engagement of driving torque by said engageable means and overdriving the sun gear of said other set adapted to activate said means for inactivating said fluid coupling.

4. A planetary gear transmission comprising an input shaft, an output shaft, two axially aligned planetary gear sets interposed therebetween each having a ring gear, a sun gear and a planet gear carrier with a plurality of planet gears each meshing with said ring and sun gears, means connecting both carriers with said output shaft, means connecting the sun gear of one set with the ring gear of the other set, a fluid coupling having an input impeller element driven by said input shaft and an output turbine element drivingly connected to the sun gear of said other set, selectively operable means for filling and emptying said fluid coupling, releasable means for holding the ring gear of said other set against backward rotation, releasable means for connecting the input shaft with the ring gear of said one set, and control means for effecting a shift from low speed drive wherein said other ring gear is held against backward rotation while said other sun gear is driven by the turbine element of said fluid coupling to a second speed drive wherein the ring gear of said one set is driven by said input shaft while said fluid coupling is empty, including timing means for emptying said fluid coupling in response to the diminution of driving torque on the sun gear of said other set.

5. In a vehicle having a throttle controlled engine, a planetary gear transmission comprising an input shaft, an output shaft, two axially aligned planetary gear sets interposed therebetween each having a ring gear, a sun gear and a planet gear carrier with a plurality of planet gears each meshing with said ring and sun gears, means connecting both carriers with said output shaft, means connecting the sun gear of one set with the ring gear of the other set, a fluid coupling having an input impeller element driven by said input shaft and an output turbine element drivingly connected to the sun gear of said other set, selectively operable means for filling and emptying said fluid coupling, releasable means for holding the ring gear of said other set against backward rotation, releasable means for holding the ring gear of said one set against forward rotation, releasable means for connecting the input shaft with the ring gear of said one set, and an automatic control system for effecting progressive forward speed upshifts characterized by a first-to-second shift valve, differential means varying with engine speed and throttle opening for actuating said shift valve to a second speed position, and means responsive to such actuation of said shift valve for exhausting fluid from said fluid coupling and establishing said connection between the input shaft and said one ring gear.

6. A transmission as set forth in claim 5 and a second-to-third speed shift valve actuated to a third speed position by said differential means after said first-to-second speed shift valve has been actuated, and means responsive to such actuation of said second-to-third speed shift valve for refilling said coupling and releasing said other ring gear.

7. A transmission as set forth in claim 6 including a manual shift lever, and a shift limiting valve responsive thereto having one position adapted to block the actuation of said second-to-third shift valve regardless of engine speed and throttle opening thereby limiting the automatic shifting to the first-to-second speed shift.

8. A transmission as set forth in claim 6 including a manual shift lever, and a shift limiting valve responsive thereto having one position adapted to block the actuation of said second-to-third shift valve regardless of engine speed and throttle opening thereby limiting the automatic shifting to the first-to-second speed shift, said shift limiting valve having a second position for blocking the actuation of both shift valves thereby limiting the transmission operation to low speed drive regardless of engine speed and throttle opening.

References Cited by the Examiner
UNITED STATES PATENTS

| | | | |
|---|---|---|---|
| 2,749,777 | 6/1956 | Simpson | 74—761 |
| 2,787,170 | 4/1957 | Forster | 74—732 X |
| 2,794,349 | 6/1957 | Smirl. | |
| 2,873,618 | 2/1959 | De Lorean | 74—645 |
| 2,882,684 | 4/1959 | Kelley | 74—677 X |
| 2,911,853 | 11/1959 | Sand | 74—677 |
| 3,159,051 | 12/1964 | Herndon et al. | 74—645 |

DON A. WAITE, *Primary Examiner.*

SAMUEL SPINTMAN, BROUGHTON G. DURHAM,
*Examiners.*